United States Patent

Sato et al.

[11] Patent Number: 6,165,927

[45] Date of Patent: *Dec. 26, 2000

[54] DIELECTRIC MATERIAL AND PROCESS FOR PRODUCING THE SAME

[75] Inventors: Motohiko Sato, Inazawa; Hitoshi Yokoi; Kazushige Ohbayashi, both of Nagoya, all of Japan

[73] Assignee: NGK Spark Plug Co., Ltd., Aichi, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/065,607

[22] Filed: Apr. 24, 1998

[30] Foreign Application Priority Data

Apr. 24, 1997 [JP] Japan .................................... 9-123578
Apr. 9, 1998 [JP] Japan .................................. 10-116058

[51] Int. Cl.⁷ .................................................. C04B 35/468
[52] U.S. Cl. ........................ 501/139; 264/614; 333/219.1
[58] Field of Search ................................. 501/137, 139; 264/614; 333/219.1

[56] References Cited

U.S. PATENT DOCUMENTS

| | | | |
|---|---|---|---|
| 4,330,631 | 5/1982 | Kawashima et al. | |
| 5,232,880 | 8/1993 | Wada et al. | 501/139 |
| 5,310,710 | 5/1994 | Takase et al. | 501/139 |
| 5,554,571 | 9/1996 | Okabe et al. | 501/139 |
| 5,750,452 | 5/1998 | Park et al. | 501/139 |
| 5,827,792 | 10/1998 | Fukuda et al. | 501/139 |

FOREIGN PATENT DOCUMENTS

| | | |
|---|---|---|
| 0701981A1 | 3/1996 | European Pat. Off. . |
| 58-185482 | 10/1983 | Japan . |
| 59-37526 | 9/1984 | Japan . |
| 59-51096 | 12/1984 | Japan . |
| 63-222064 | 9/1988 | Japan . |
| 6-275126 | 9/1994 | Japan . |
| 6-309 926 | 11/1994 | Japan . |
| 6-309926 | 11/1994 | Japan . |
| 6-325 620 | 11/1994 | Japan . |
| 6-325620 | 11/1994 | Japan . |
| 9-077 556 | 3/1997 | Japan . |

OTHER PUBLICATIONS

Y. Inaguma et al, Solid State Ionics, vol. 70/71, 1994, pp. 196–202.

*Primary Examiner*—Karl Group
*Attorney, Agent, or Firm*—Sughrue, Mion, Zinn, Macpeak & Seas, PLLC

[57] ABSTRACT

A dielectric material based on $BaO\text{-}RE_2O_3\text{-}TiO_2$ is disclosed, which has a relatively high relative permittivity $\epsilon_r$, a small absolute value of the temperature coefficient of resonance frequency $\tau_f$ and a high coefficient of unloaded quality $Q_u$. Processes for producing the dielectric material are also disclosed. The dielectric material comprises 100 parts by weight of main ingredients having a composition represented by $xBaO\text{-}yRE_2O_3\text{-}zTiO_2$ (wherein RE represents a rare earth element and $x+y+z=100$) and up to 5 parts by weight of at least one alkali metal oxide. This alkali metal oxide serves to improve $\epsilon_r$ and $Q_u$ without a considerable sacrifice of $\tau_f$. The RE preferably consists of samarium or a combination of samarium with neodymium and/or lanthanum. In producing the dielectric material, a dense sintered body can be obtained without fail by using a raw material containing hydroxyl groups as a starting material for the rare-earth ingredient among the main ingredients.

15 Claims, 3 Drawing Sheets

DIELECTRIC MATERIAL AND PROCESS FOR PRODUCING THE SAME

FIELD OF THE INVENTION

The present invention relates to processes for producing a dielectric material. More particularly, this invention relates to a dielectric material having excellent properties, i.e., a relatively large value of relative permittivity (hereinafter referred to as "$\epsilon_r$") in a high-frequency region, a small absolute value of the temperature coefficient of resonance frequency (hereinafter resonance frequency is referred to as "$f_0$" and the temperature coefficient thereof is referred to as "$\tau_f$"), and a large value of unloaded quality coefficient (hereinafter referred to as "$Q_u$"), and to processes for producing the same. The dielectric material of the present invention is advantageously used in applications such as multilayer circuit boards, in particular, resonators and filters for use in a high-frequency region.

BACKGROUND OF THE INVENTION

With the recent increase in the amount of communication information, rapid progress is being made in various communication systems utilizing the microwave region, such as, e.g., car telephones, satellite communication, and satellite broadcasting, and many microwave dielectric materials have been developed therewith.

Among such microwave dielectric materials, the dielectric porcelains for use in resonators, filters, and the like are required to have the following properties (i) to (iii):

(i) to have a high relative permittivity $\epsilon_r$;

(ii) to have a high unloaded quality coefficient $Q_u$ (i.e., a small dielectric loss $1/Q_u$); and (iii) to have a small absolute value of the temperature coefficient $\tau_f$ of resonance frequency $f_0$ (i.e., a small temperature dependence of $f_0$).

Dielectric materials such as $Ba(Mg_{1/3}Ta_{2/3})O_3$ and $Ba(Zn_{1/3}Ta_{2/3})O_3$ have been known to have a small dielectric loss among those properties, while dielectric materials such as $BaO\text{-}RE_2O_3\text{-}TiO_2$ (wherein RE represents a rare earth element) have been known to have a high relative permittivity.

In JP-A-6-275126 (the term "JP-A" as used herein means an "unexamined published Japanese patent application") is disclosed a dielectric porcelain composition which comprises barium (Ba), bismuth (Bi), titanium (Ti), and oxygen (O) as essential components and may contain neodymium (Nd) and samarium (Sm) as optional components. In JP-A-6-309926 and JP-A-6-325620 is disclosed a dielectric porcelain composition which has been improved in dielectric characteristics by incorporating sodium (Na), potassium (K), and lithium (Li) into the dielectric porcelain composition described above. Specifically, there is a description therein which contains "the value of Q can be improved without changing relative permittivity $\epsilon_r$".

SUMMARY OF THE INVENTION

An object of the present invention is to provide a dielectric material based on the composition $BaO\text{-}RE_2O_3\text{-}TiO_2$ which need not contain bismuth (Bi) as an essential component, unlike the dielectric porcelain compositions described above, and having a further improved $Q_u$ as compared with the conventional compositions.

Another object of the present invention is to provide processes suitable for producing the dielectric material.

The present inventors have found that the $\epsilon_r$ and $Q_u$ of a $BaO\text{-}RE_2O_3\text{-}TiO_2$ dielectric material can be improved without a considerable sacrifice (deterioration) of $\tau_f$ by incorporating a small amount of an alkali metal oxide, which has been regarded as an undesirable ingredient generally functions to increase dielectric loss. They have further found processes for producing, without fail, a dense sintered body having the above composition and excellent dielectric characteristics. The present invention has been completed based on these findings.

The present invention provides, as described in an aspect of the present invention, a dielectric material which comprises main ingredients having a composition represented by $xBaO\text{-}yRE_2O_3\text{-}zTiO_2$ (wherein RE represents at least one rare earth element and $x+y+z=100$) and at least one alkali metal oxide, the content of the alkali metal oxide being up to 5 parts by weight per 100 parts by weight of the main ingredient.

DETAILED DESCRIPTION OF THE INVENTION

Figure 1:
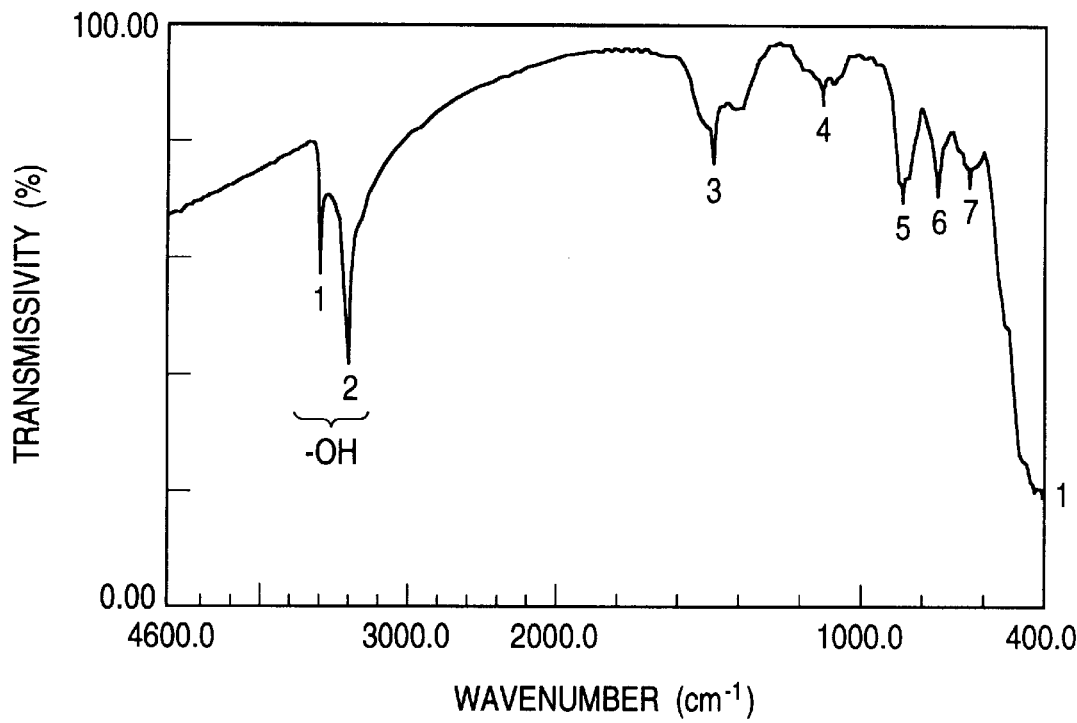
FIG. 1 is an FT-IR chart of hydroxyl-containing $Sm_2O_3$ used as a starting material for a rare-earth ingredient in Examples.

The "alkali metal oxide" for use in the present invention is preferably the oxide of lithium (Li), sodium (Na), or potassium (K) because it is inexpensive and easy to handle. By incorporating an alkali metal oxide, $\epsilon_r$ and $Q_u$ can be improved without a considerable sacrifice of $\tau_f$. The incorporation of an alkali metal oxide is also effective in attaining a reduced sintering temperature. Namely, a sufficiently dense sintered body can be obtained even at a lower sintering temperature. Namely, a sufficiently dense sintered body can be obtained even at a lower sintering temperature.

In producing the dielectric material, the alkali metal may be added either in the form of the oxide thereof or as the carbonate, nitrate, oxalate, or sulfate thereof or the like.

The content of the alkali metal oxide in the dielectric material of the present invention is up to 5 parts by weight per 100 parts by weight of the main ingredient. This is because if the content thereof exceeds 5 parts by weight, sintering does not proceed stably and this results in a reduced $Q_u$ or in that the $\tau_f$ shifts to the minus side to have an increased absolute value. When the content of the alkali metal oxide is 0.1 to 2.0 parts by weight, especially 0.2 to 1.0 part by weight, a dielectric material having sufficient dielectric characteristics in practical use tends to be obtained. When x, y, and z in the main ingredient satisfy $7.5 \leq x \leq 27.0$, $1.0 \leq y \leq 30.0$ and $55.0 \leq z \leq 91.5$ or satisfy $5.0 \leq x \leq 27.0$, $4.0 \leq y \leq 29.0$, and $56.0 \leq z \leq 80.0$, especially $10.0 \leq x \leq 22.5$, $11.0 \leq y \leq 21.0$, and $62.5 \leq z \leq 72.5$, a dielectric material having more excellent dielectric characteristics can be obtained when the content of the alkali metal oxide is 0.1 to 0.5% by weight, preferably 0.15 to 0.3% by weight.

The proportion (x) of BaO in the main ingredient is preferably from 0 to 27.0% by mol (excluding 0 mol %), more preferably from 5.0 to 22.5% by mol. BaO is an essential component for improving $\epsilon_r$. By regulating the proportion of BaO to a value not larger than 27.0% by mol, the effect of improving $Q_u$ tends to be enhanced.

The proportion (y) of $RE_2O_3$ in the main ingredient is preferably from 0 to 30.0% by mol (excluding 0 mol %), more preferably from 0 to 21.0% by mol (excluding 0 mol %). By incorporating $RE_2O_3$, the effect of reducing the absolute value of $\tau_f$ becomes sufficient. On the other hand, by regulating the proportion of $RE_2O_3$ to a value not larger than 30.0% by mol, the effect of improving $Q_u$ tends to be enhanced.

The proportion (z) of $TiO_2$ in the main ingredient is preferably from 55.0 to 100.0% by mol (excluding 100.0 mol %), more preferably from 62.5 to 95.0% by mol (excluding 95.0%). By regulating the proportion of $TiO_2$ to a value not smaller than 55.0% by mol, the effect of improving $Q_u$ value tends to become sufficient. On the other hand, since the absolute value of $\tau_f$ tends to be enhanced when the proportion of $TiO_2$ is large, the proportion of $TiO_2$ is preferably not larger than 90.0% by mol, more preferably not larger than 80.0% by mol.

In the main ingredient, RE comprises one or more rare earth elements and preferably comprises at least samarium. As a second aspect of the present invention, $RE_2O_3$ among the main ingredients is preferably a rare-earth oxide represented by the composition formula $\{(Sm_2O_3)_{1-a-b}(Nd_2O_3)_a (La_2O_3)_b\}$ (wherein $0 \leq a < 1$, $0 \leq b < 1$, and $a+b<1$). This means that the $RE_2O_3$ comprises at least an oxide of samarium (Sm), and it consists of a samarium oxide alone ($a=b=0$) or of a samarium oxide in which the samarium has been partly replaced by neodymium (Nd) and/or lanthanum (La). With respect to the proportion of $Sm_2O_3$, the relationship: $0.25 \leq 1-a-b \leq 1$ is preferred.

The dielectric material of the present invention preferably has a value of $\epsilon_r$ as large as 50 to 90. The dielectric material of the present invention preferably has a product of the unloaded quality coefficient and resonance frequency of 5,700 GHz or more, more preferably 6,500 GHz or more. The dielectric material of the present invention preferably has a temperature coefficient of resonance frequency of between −20 and +20 ppm/°C., more preferably between −10 and +10 ppm/°C.

The dielectric material of the present invention may be produced by mixing the raw materials, (optionally calcining the mixture), compacting the mixture, and sintering the compact. The calcination may be conducted at a temperature of 1,000 to 1,200° C. for 1 to 3 hours (e.g., 1000° C., 2 hours). The sintering may be conducted at a temperature of 1,250° C. to 1,400° C. for 1 to 5 hours (e.g., 1,350° C., 2 hours).

The dielectric material of the present invention is produced, for example, by the process described below. In this process, a raw material containing hydroxyl groups is used as a starting material for the rare-earth ingredient among the main ingredient. The term "a starting material containing hydroxyl groups" means that the starting material, when analyzed by Fourier-transform infrared absorption spectrometry (hereinafter referred to as "FT-IR"), gives a chart having a peak assignable to hydroxyl. Examples of such a raw material include rare-earth oxides having a layer of adsorbed water on the particle surface thereof and rare-earth hydroxides. Preferred of these are rare-earth hydroxides represented, for example, by the composition formula $RE(OH)_3$.

By using a raw material containing hydroxyl groups as described above, a dielectric material which is dense and capable of being sufficiently analyzed for dielectric characteristics can be obtained even when a nonaqueous solvent, e.g., ethanol, is used as a dispersion medium for primary mixing/pulverization in producing the dielectric material. Although the reason for this has not been fully elucidated, it is thought that the hydroxyl groups contained in the starting material are eliminated during calcination or sintering to activate the surface of the raw material, whereby sintering reactions are accelerated and the compact becomes more apt to be densified.

Also in the case where at least one member selected from rare-earth oxalates, rare-earth chlorides, rare-earth nitrates, and rare-earth sulfates is used as a starting material besides a rare-earth hydroxide, the functional groups in these rare-earth compounds are eliminated likewise during calcination or sintering, whereby sintering reactions are accelerated and a dense dielectric material can be obtained.

Even when a rare-earth compound, e.g., oxide, in which no hydroxyl groups are detected, e.g., by FT-IR is used as a starting material, the dielectric material of the present invention can be produced by conducting a step of incorporating hydroxyl groups into the starting material or by using water as a dispersion medium, for example, in the step of mixing raw materials.

On the other hand, if a raw material containing no hydroxyl groups is used as a starting material and a non-aqueous solvent is used as a dispersion medium for primary mixing/pulverization, the result is a problem that the densification of the dielectric material is insufficient and the dielectric characteristics thereof cannot be determined.

It is especially preferred to use samarium as an essential rare-earth element in the above-described processes for producing the dielectric material of the present invention.

From the standpoint of density, the dielectric material of the present invention preferably has a degree of volumetric shrinkage of 15% or more, or preferably has a coefficient of water absorption of 0.1% or less.

EXAMPLES

The present invention will be explained below in more detail by reference to Examples and Comparative Examples, but the invention should not be construed as being limited thereto. Hereinafter, "parts by weight" is referred to simply as "parts".

(1) Investigation on Dielectric Material Compositions

Samples Nos. 1 to 37 of Examples each having a composition according to the present invention and samples Nos. 38 to 44 of Comparative Examples were produced by the following method.

Given amounts of commercial powders of $BaCO_3$, $Sm(OH)_3$, $TiO_2$, and $A_2CO_3$ (wherein A represents an alkali metal) were weighed out so as to result in each of the compositions shown in Tables 1 and 2 in terms of oxide proportion. These compositions each corresponds to main dielectric material ingredients represented by the composition formula given in the second aspect of the present invention in which a=b=0.

The powders for each composition were wet-mixed using an ethanol solvent, and the powder mixture obtained was calcined in the air atmosphere at 1,000° C. for 2 hours. To each of these calcinated products were added a wax binder, a dispersant, and ethanol. These mixtures each was pulverized and mixed by means of a ball mill. The resultant slurries were dried, granulated, and then compacted at a pressure of 10 MPa into a cylindrical form having a diameter of 20 mm and a thickness of 12 mm. Subsequently, the compacts were subjected to CIP (cold isostatic pressing) at a pressure of 150 MPa and then sintered for 2 hours in the air atmosphere at each of the temperatures shown in Tables 1 and 2. Thus, dielectric material samples Nos. 1 to 44 were obtained.

Sample Nos. 38 and 41–44 is a dielectric material containing no alkali metal oxide, while samples Nos. 39 and 40 are dielectric materials each containing too large an amount of an alkali metal oxide.

The sintered bodies (dielectric materials) obtained were subjected to surface grinding and then examined for relative permittivity $\epsilon_r$, unloaded quality coefficient $Q_u$, and temperature coefficient of resonance frequency $\tau_f$ by the Hakki and Coleman's method in a frequency range of from 2 to 4 GHz (temperature range: 25–80° C.). The results obtained are shown in Tables 1 and 2.

TABLE 1

| Sample No. | | Main Ingredient (mol %) | | | Alkali Metal Oxide ($A_2O$) | | Sintering Temperature (° C.) | Dielectric Characteristics | | |
|---|---|---|---|---|---|---|---|---|---|---|
| | | BaO x | $Sm_2O_3$ y | $TiO_2$ z | Metal kind | Amount (parts) | | $\epsilon_r$ | $Q_u \times f_0$ (GHz) | $\tau_f$ (ppm/° C.) |
| Example | 1 | 25.0 | 15.0 | 60.0 | Na | 1.0 | 1350 | 84 | 5830 | +10 |
| | 2 | 22.5 | 10.0 | 67.5 | ↑ | 2.7 | 1300 | 83 | 6120 | +6 |
| | 3 | 7.5 | 7.5 | 85.0 | ↑ | 4.0 | 1280 | 88 | 5900 | +13 |
| | 4 | 15.0 | 25.0 | 60.0 | ↑ | 2.0 | 1300 | 82 | 5700 | −7 |
| | 5 | 13.0 | 17.0 | 70.0 | ↑ | 0.3 | 1350 | 85 | 7600 | −10 |
| | 6 | 22.5 | 15.0 | 62.5 | ↑ | 1.2 | 1330 | 80 | 6500 | +10 |
| | 7 | 7.5 | 15.0 | 77.5 | ↑ | 4.5 | 1280 | 84 | 6800 | −15 |
| | 8 | 16.0 | 16.0 | 68.0 | ↑ | 0.5 | 1350 | 84 | 7800 | 0 |
| | 9 | 16.5 | 16.5 | 67.0 | Li | 0.8 | | 82 | 7150 | +10 |
| | 10 | 15.5 | 15.5 | 69.0 | K | 0.2 | | 85 | 7500 | −5 |
| | 11 | 17.5 | 17.5 | 65.0 | Na | 0.25 | | 66 | 6600 | +10 |
| | 12 | | 10.0 | 72.5 | ↑ | 0.50 | | 66 | 8500 | 0 |
| | 13 | | | | ↑ | 0.75 | | 68 | 8200 | +9 |
| | 14 | | 7.5 | 75.0 | ↑ | 0.25 | | 57 | 10300 | +5 |
| | 15 | | | | ↑ | 0.50 | | 59 | 9700 | +9 |
| | 16 | | 5.0 | 77.5 | ↑ | | | 51 | 10800 | +13 |
| | 17 | | | | ↑ | 0.75 | | 50 | 10200 | +15 |
| | 18 | 15.0 | 15.0 | 70.0 | ↑ | 0.25 | | 75 | 6800 | −16 |
| | 19 | | | | ↑ | 0.50 | | 76 | 7700 | −11 |
| | 20 | | | | ↑ | 0.75 | | 78 | 7500 | −6 |
| | 21 | | 12.5 | 72.5 | ↑ | 0.50 | | 71 | 8100 | −3 |
| | 22 | | | | ↑ | 0.75 | | 71 | 7900 | +1 |

TABLE 2

| Sample No. | | Main Ingredient (mol %) | | | Alkali Metal Oxide ($A_2O$) | | Sintering Temperature (° C.) | Dielectric Characteristics | | |
|---|---|---|---|---|---|---|---|---|---|---|
| | | BaO x | $Sm_2O_3$ y | $TiO_2$ z | Metal kind | Amount (parts) | | $\epsilon_r$ | $Q_u \times f_0$ (GHz) | $\tau_f$ (ppm/° C.) |
| Example | 23 | 15.0 | 10.0 | 75.0 | Na | 0.50 | 1350 | 67 | 8200 | +5 |
| | 24 | | | | ↑ | 1.00 | | 63 | 7300 | +10 |
| | 25 | | 7.5 | 77.5 | ↑ | 0.50 | | 61 | 9000 | +15 |
| | 26 | | | | ↑ | 0.75 | | 60 | 8000 | +17 |
| | 27 | | | | ↑ | 1.00 | | 60 | 8100 | +19 |
| | 28 | | 5.0 | 80.0 | ↑ | 0.50 | | 56 | 8400 | +20 |
| | 29 | | 2.5 | 82.5 | ↑ | 0.25 | | 52 | 9100 | +24 |

TABLE 2-continued

| | | Main Ingredient (mol %) | | Alkali Metal Oxide ($A_2O$) | | Sintering | Dielectric Characteristics | | |
|---|---|---|---|---|---|---|---|---|---|
| Sample No. | BaO x | $Sm_2O_3$ y | $TiO_2$ z | Metal kind | Amount (parts) | Temperature (°C.) | $\epsilon_r$ | $Q_u \times f_0$ (GHz) | $\tau_f$ (ppm/°C.) |
| 30 | | 1.0 | 84.0 | ↑ | | | 50 | 8700 | +28 |
| 31 | 12.5 | 15.0 | 72.5 | ↑ | 0.75 | | 84 | 7400 | +10 |
| 32 | | 12.5 | 75.0 | ↑ | | | 79 | 7700 | +18 |
| 33 | | 7.5 | 80.0 | ↑ | 0.50 | | 70 | 8600 | +25 |
| 34 | | 5.0 | 82.5 | ↑ | | | 64 | 8900 | +29 |
| 35 | 10.0 | 10.0 | 80.0 | ↑ | 1.00 | | 80 | 6700 | +18 |
| 36 | | 7.5 | 82.5 | ↑ | 0.50 | | 79 | 8200 | +20 |
| 37 | 7.5 | 5.0 | 87.5 | ↑ | | | 82 | 7300 | +16 |
| Comp. 38 | 12.5 | 20.0 | 67.5 | — | — | 1400 | 75 | 2510 | +10 |
| Ex- 39 | 14.0 | 19.0 | 67.0 | Na | 6.0 | 1280 | 83 | 2500 | −30 |
| ample 40 | 16.5 | 15.0 | 68.5 | K | 10.0 | 1250 | 90 | 1280 | −100 |
| 41 | 17.5 | 5.0 | 77.5 | — | — | 1350 | very weak resonance | | |
| 42 | 15.0 | 15.0 | 70.0 | — | — | | | | |
| 43 | | 12.5 | 72.5 | — | — | | | | |
| 44 | | 7.5 | 77.5 | — | — | | | | |

Tables 1 and 2 show the following. Samples Nos. 1 to 37, which were dielectric materials according to the present invention, each had a value of $\epsilon_r$ as large as 50 to 90, a high $Q_u$ value and an absolute value of $\tau_f$ as small as 30 ppm/°C. or below. Especially, when z was less than 80 mol %, each of absolute values of $\tau_f$ was 19 ppm/°C. or less, which were not lowered so much compared with sample No. 38, a comparative sample containing no alkali metal oxide, and at least, either $\epsilon_r$ or $Q_u \times f_0$ value was improved compared with sample No. 38. Furthermore, even if z was 80 mol % or more, at least, either $\epsilon_r$ or $Q_u \times f_0$ values was improved greatly. It was thus found that incorporating an alkali metal oxide in an amount not larger than 5 parts was effective in improving $\epsilon_r$ and $Q_u \times f_0$ while maintaining a comparatively small absolute value of $\tau_f$. Furthermore, samples Nos. 1 to 37 were capable of being sintered at lower temperatures than sample No. 38, and each gave a sufficiently dense sintered body.

(2) Investigation of Starting Materials

Figure 2:
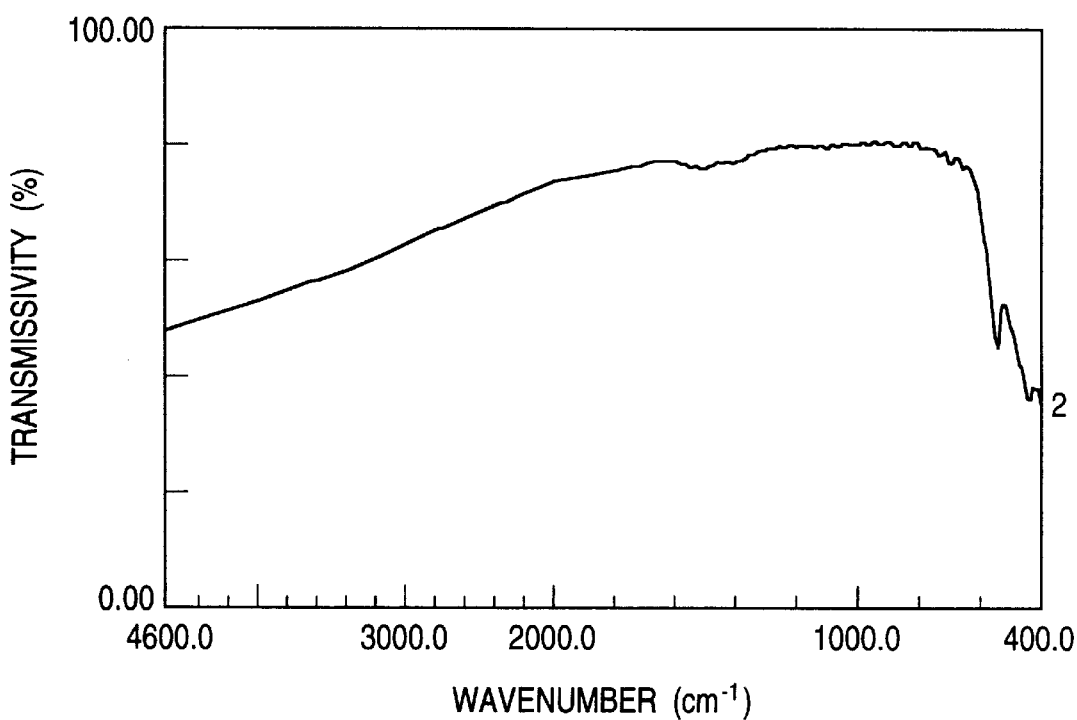
FIG. 2 is an FT-IR chart of hydroxyl-free $Sm_2O_3$ used as a starting material for a rare-earth ingredient in Examples.

Samples Nos. 45 to 47 which had the same composition as sample No. 8 were produced using $Sm_2O_3$ containing hydroxyl groups or $Sm_2O_3$ containing no hydroxyl groups in place of the $Sm(OH)_3$ used as a starting material for the samarium ingredient in producing sample No. 8. FT-IR charts of the "$Sm_2O_3$ containing hydroxyl groups" and "$Sm_2O_3$ containing no hydroxyl groups" used are shown in FIGS. 1 and 2, respectively. The same starting materials and method as those for sample No. 8 were used, except that the two raw materials shown above were used as a starting material for the samarium ingredient, and that the sintering temperatures shown in Table 3 were used.

These samples were examined for dielectric characteristics in the same manner as in (1) above. The results obtained are shown in Table 3 together with the degree of volumetric shrinkage by sintering of each sample.

TABLE 3

| Sample No. | Starting Material of Samarium | Dispersion Medium | Alkali Metal Oxide | | Sintering Temperature (°C.) | Degree of Shrinkage (%) | Dielectric Characteristics | | |
|---|---|---|---|---|---|---|---|---|---|
| | | | Metal kind | Amount (parts) | | | $\epsilon_r$ | $Q_u \times f_0$ (GHz) | $\tau_f$ (ppm/°C.) |
| 8 | $Sm(OH)_3$ | ethanol | Na | 0.5 | 1350 | 24.4 | 84 | 7800 | 0 |
| 45 | hydroxyl-containing $Sm_2O_3$ | ↑ | ↑ | ↑ | 1350 | 24.0 | 87 | 7500 | −2 |
| 46 | hydroxyl-free $Sm_2O_3$ | ↑ | ↑ | ↑ | 1350 | 7.2 | unable to be determined | | |
| 47 | ↑ | ↑ | ↑ | ↑ | 1400 | 10.8 | unable to be determined | | |

On the other hand, samples Nos. 39 and 40, which were dielectric materials each containing too large an amount of an alkali metal oxide, each had a significantly reduced $Q_u \times f_0$ and a large minus value of $\tau_f$, although improved in $\epsilon_r$ as compared with sample No. 38. Furthermore, sample Nos. 41 to 44, which were comparative samples not containing alkali metal oxides, showed very weak resonance even if the main ingredient composition were varied, so that it was impossible to evaluate dielectric characteristics.

Table 3 shows that sample No. 8, produced using $Sm(OH)_3$ as a starting material for the samarium ingredient, and sample No. 45, produced using hydroxyl-containing $Sm_2O_3$ as the starting material, each was a dense sintered body which had a degree of volumetric shrinkage by sintering as high as 20% or above. These samples further had satisfactory dielectric characteristics.

On the other hand, samples Nos. 46 and 47, produced using hydroxyl-free $Sm_2O_3$ as a starting material for the samarium ingredient, each had a degree of volumetric shrinkage as low as 11% or below and had been insufficiently densified. Dielectric characteristics of these two samples were hence unable to be determined. Although use of a higher sintering temperature enhanced the degree of shrinkage in some degree (sample No. 47), it failed to attain denseness sufficient for the determination of dielectric characteristics.

(3) Investigation on Dispersion Media for Primary Mixing/Pulverization

Sample No. 48 was produced using the same raw materials and method as those for sample No. 46, except that water was used in place of ethanol, which was used in the preparation of sample No. 46, as the dispersion medium for primary mixing/pulverization.

In Table 4 are shown the degree of volumetric shrinkage by sintering of sample No. 48 and the dielectric characteristics thereof determined in the same manner as in the above (1).

Table 5 shows that each of samples Nos. 49 to 51, in which the samarium had been partly replaced by neodymium, had excellent dielectric characteristics like sample No. 5. Table 5 further shows that as the degree of replacement by neodymium increased, from sample No. 49 to sample No. 51, the value of $\tau_f$ shifted to the plus side. It can be seen from these results that by regulating the samarium/neodymium ratio, the value of $\tau_f$ can be controlled without exerting a considerable influence on $\epsilon_r$ and $Q_u \times f_0$. It can also be seen from the results of these Examples that even when a hydroxyl-free starting material for the neodymium ingredient was used, densification is possible as long as a hydroxyl-containing raw material was used as a starting material for the samarium ingredient.

(5) An Example of Dielectric Resonator Prepared by Using Dielectric Material of the Invention The dielectric material of the present invention may be used in a dielectric resonator described in U.S. Pat. No. 5,136,270, hereby incorporated by reference.

TABLE 4

| Sample No. | Starting Material of Samarium | Dispersion Medium | Alkali Metal Oxide | | Sintering Temperature (° C.) | Degree of Shrinkage (%) | Dielectric Characteristics | | |
|---|---|---|---|---|---|---|---|---|---|
| | | | Metal kind | Amount (parts) | | | $\epsilon_r$ | $Q_u \times f_0$ (GHz) | $\tau_f$ (ppm/° C.) |
| 46 | hydroxyl-free $Sm_2O_3$ | ethanol | Na | 0.5 | 1350 | 7.2 | | unable to be determined | |
| 48 | ↑ | water | ↑ | ↑ | ↑ | 23.6 | 83 | 7200 | +3 |

Table 4 shows that even when a starting material containing no hydroxyl groups was used, a sufficiently dense sintered body having a degree of shrinkage heightened to 23.6% and excellent dielectric characteristics was obtained by using water as the dispersion medium for primary mixing/pulverization.

(4) Investigation on Rare Earth Elements

Samples Nos. 49 to 51 were produced which each had the same composition as sample No. 5 except that part of the samarium had been replaced by neodymium as shown in Table 5. As a starting material for the neodymium ingredient was used $Nd_2O_3$ containing no hydroxyl groups. Except the above, the same raw materials and method as those for sample No. 5 were used.

These samples were examined for dielectric characteristics in the same manner as in (1) above. The results obtained are shown in Table 5.

Figure 3:
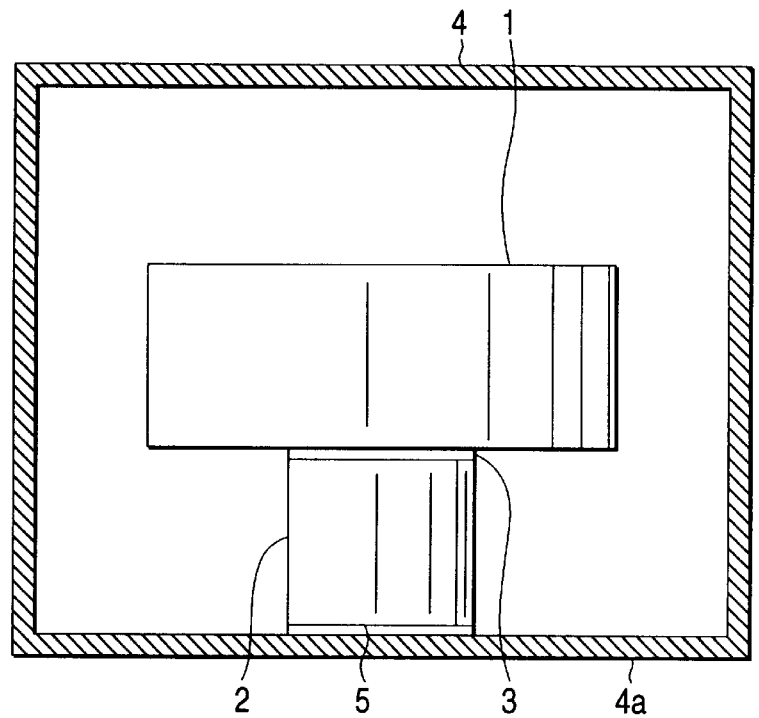
FIG. 3 illustrates a dielectric resonator utilizing the dielectric material of the present invention.

FIG. 3 illustrates an example of such a dielectric resonator of providing resonator body 1 comprising the dielectric material of the present invention. The resonator body 1 is bonded to one end of holding member 2 by means of, for example, an epoxy resin type adhesive. The integrated resonator body 1 and holding member 2 are contained in the inside of metal container 4 of a cylindrical shape the both end surface of which are sealed up. One end of the holding member 2 is fixed and bonded to the center of the bottom surface 4a of the metal container 4 by means of PTTF.

(6) An Example of Dielectric Filter Prepared by Using Dielectric Material of the Invention The dielectric material of the present invention may be used in a dielectric filter described in U.S. Pat. No. 5,537,085, hereby incorporated by reference.

Figure 4:
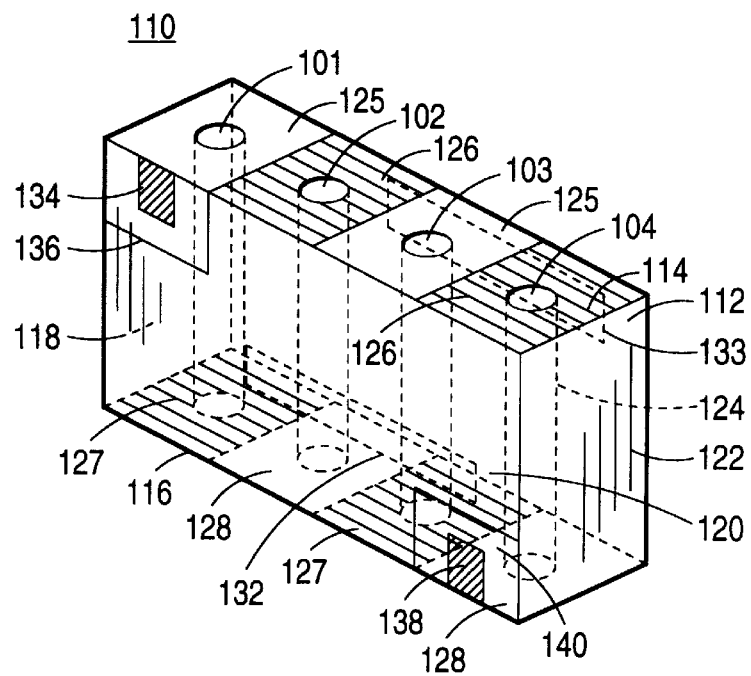
FIG. 4 illustrates a dielectric filter utilizing the dielectric material of the present invention.

FIG. 4 illustrates an example of such a four pole high zero interdigital block filter 110. The filter 110 includes a filter body 112 having a block of the dielectric material of the present invention and having top and bottom surfaces 114

TABLE 5

| | Sample No. | Main Ingredient (mol %) | | | | Alkali Metal Oxide ($A_2O$) | | Sintering Temperature (° C.) | Dielectric Characteristics | | |
|---|---|---|---|---|---|---|---|---|---|---|---|
| | | BaO x | $Sm_2O_3$ y | $Nd_2O_3$ | $TiO_2$ z | Metal kind | Amount (parts) | | $\epsilon_r$ | $Q_u \times f_0$ (GHz) | $\tau_f$ (ppm/° C.) |
| Example | 5 | 15.0 | 17.0 | — | 68.0 | Na | 0.3 | 1350 | 85 | 7600 | −10 |
| | 49 | ↑ | 12.7 | 4.3 | 68.0 | ↑ | ↑ | ↑ | 86 | 7700 | 0 |
| | 50 | ↑ | 8.5 | 8.5 | 68.0 | ↑ | ↑ | ↑ | 86 | 7500 | +3 |
| | 51 | ↑ | 4.3 | 12.7 | 68.0 | ↑ | ↑ | ↑ | 88 | 7600 | +10 | and 116 and side surfaces 118, 120, 122 and 124. The filter body has a plurality of through-holes extending from the top surface to the bottom surface 114 to 116 defining a first resonator 101, a second resonator 102, a third resonator 103, and a fourth resonator 104.

The surfaces 118, 120, 122 and 124 are substantially covered with a conductive material defining a metallized exterior layer, with the exception that the top surface 114 and the bottom surface 116 are selectively metallized in the areas substantially surrounding the resonators defining an interdegital filter design. More specifically, top surface 114 adjacent to a first and a third resonator 101 and 103 are unmetallized 125, and a bottom surface 116 adjacent to a second 102 and a fourth resonator 104 are unmetallized 128. To complete the interdigital design, the bottom surface 116 adjacent to a first and a third resonator 101 and 103 are metallized 127, and the top surface adjacent to the second and a fourth resonator 104 are metallized 126.

Additionally, a portion of one of the side surfaces is substantially uncoated (comprising the dielectric material) in proximity to one of the ends of the block, and extends at least in proximity to between alternate resonators, defining a magnetic transmission line 132 for magnetically coupling the resonators. The ceramic filter 110 also includes first and second input-output means, and preferably in the form of pads 134 and 138 comprising an area of conductive material on at least one of the side surfaces and substantially surrounded by at least one or more uncoated areas 136 and 140 of the dielectric material.

In this embodiment, the input-output pads 134 and 138 are offset on opposite ends of the block. This is necessary because the input-output pads are located near the non-grounded ends of their respective resonators to achieve maximum electrical coupling. In the four-pole resonator design in FIG. 4, the first resonator 101 and the fourth resonator 104 are grounded at opposite ends of the block filter 110, thus requiring the input-output pads to be offset at opposite ends of the block.

The magnetic transmission line 132 may be located on the front surface of the block 120, on the rear surface of the block 124, or both the front and rear surfaces of the block as design parameters dictate. However, in a preferred embodiment, only a single magnetic transmission line 132 is placed on the rear surface 124 opposite to the surface 120 containing the input-output pads 134 and 138.

The magnetic transmission line 132 can be varied to achieve maximum design flexibility. In this embodiment, the magnetic transmission line 132 may extent laterally at least in proximity to the first and third resonators or it may extend laterally in proximity to the second and fourth resonators, shown as item 133 in FIG. 4. The four pole interdigital block filter 110 can lead to a product which is easier to manufacture, and require less processing steps, than conventional four pole ceramic block filters.

(7) A second Example of Dielectric Filter Prepared by Using Dielectric Material of the Invention The dielectric material of the present invention may be used in a dielectric filter described in U.S. Pat. No. 5,612,654, hereby incorporated by reference.

Figure 5A:
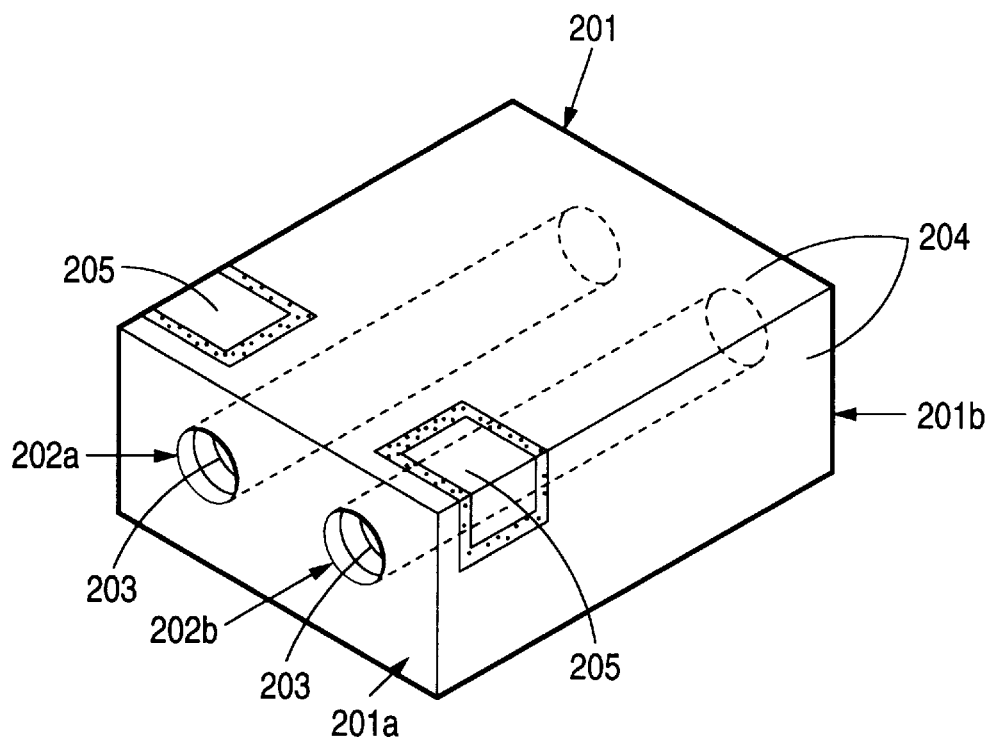
FIG. 5A is a perspective view of a dielectric filter utilizing the dielectric material of the present invention.
Figure 5B:
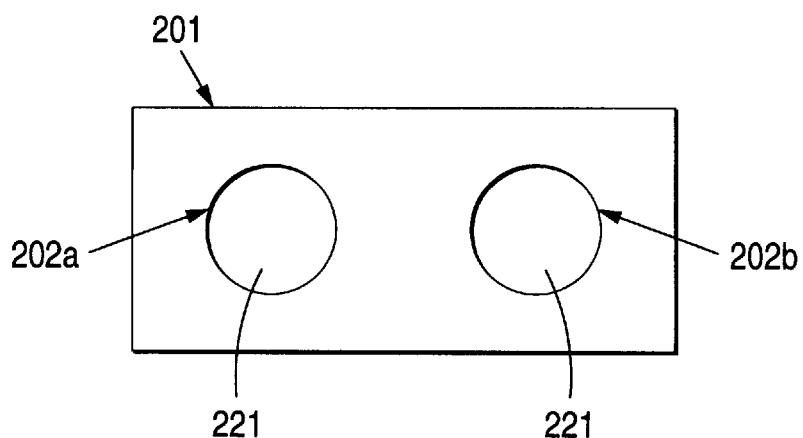
FIG. 5B is a front view of taken from the open end surface of FIG. 5A.

For example, the dielectric filter shown in FIGS. 5A and 5B includes resonator holes 202a and 202b.

In the structure shown in FIGS. 5A and 5B, the coupling between the two resonators formed at resonator holes 202a and 202b is inductive coupling, and one attenuation pole is formed in the high frequency range of the pass band. A pair of input/output electrodes 205 are formed at prescribed portions on the outer surface of dielectric block 201. Inner conductors 203 are formed on the inner surfaces of resonator holes 202a and 202b.

While the invention has been described in detail and with reference to specific embodiments thereof, it will be apparent to one skilled in the art that various changes and modifications can be made therein according to purposes or applications without departing from the spirit and scope thereof. Furthermore, besides the main ingredients and alkali metal oxide described above, other additives or unavoidable impurities and the like may be contained in the dielectric material of the present invention as long as the dielectric characteristics of the dielectric material are not substantially influenced thereby.

The dielectric material of the present invention has excellent properties, i.e., a relatively high relative permittivity $\epsilon_r$, a small absolute value of the temperature coefficient of resonance frequency $\tau_f$, and a high coefficient of unloaded quality $Q_u$. The dielectric material is therefore useful in multilayer circuit boards, in particular, resonators, filters, and the like used in a high-frequency region.

According to the processes of the present invention, the dielectric material described above can be produced as a dense sintered body without fail.

What is claimed is:

1. A dielectric material which consists essentially of:
    a composition represented by $xBaO-yRE_2O_3-zTiO_2$ as a main ingredient, wherein RE represents at least one rare earth element and $x+y+z=100$, and x, y, and z satisfy $7.5 \leq x \leq 27.0$, $1.0 \leq y \leq 30.0$, and $55.0 \leq z < 91.5$; and
    at least one alkali metal oxide,
    wherein the content of said at least one alkali metal oxide is an amount up to 5 parts by weight per 100 parts by weight of the main ingredient.

2. The dielectric material of claim 1, wherein the rare-earth oxide represented by $RE_2O_3$ in the main ingredient is represented by the composition formula $\{(Sm_2O_3)_{1-a-b}(Nd_2O_3)_a(La_2O_3)_b\}$, wherein $0 \leq a < 1$, $0 \leq b < 1$, and $a+b < 1$.

3. The dielectric material of claim 1, wherein x, y, and z in the main ingredient satisfy $7.5 \leq x \leq 22.5$, $1.0 \leq y \leq 21.0$, and $62.5 \leq z < 91.5$.

4. The dielectric material of claim 1, which is produced by using a raw material thereof containing a hydroxyl group as a starting material for the rare-earth element in the main ingredient.

5. The dielectric material of claim 1, which shows a degree of volumetric shrinkage by sintering of 15% or more.

6. The dielectric material of claim 1, which has a coefficient of water absorption of 0.1% or less.

7. The dielectric material of claim 1, which has a relative permittivity of 50 or more, a product of the unloaded quality coefficient and resonance frequency of 5,700 GHz or more, and a temperature coefficient of resonance frequency of between −20 and +20 ppm/°C.

8. A process for producing a dielectric material as claimed in claim 1, which comprises the steps of:
    mixing a barium ingredient, a rare-earth element containing a hydroxyl group, a titanium ingredient and an alkali metal ingredient to produce a mixture;

compacting the mixture to produce a compact; and sintering the compact to prepare the dielectric material.

9. The process of claim 8, wherein the rare-earth element containing a hydroxyl group is a rare-earth hydroxide represented by the composition formula $RE(OH)_3$.

10. A process for producing a dielectric material as claimed in claim 1, which comprises the steps of:

introducing a hydroxyl group into the surface of a rare-earth element to prepare a rare-earth element containing a hydroxyl group;

mixing a barium ingredient, the rare-earth element containing a hydroxyl group, a titanium ingredient and an alkali metal ingredient to produce a mixture;

compacting the mixture to produce a compact; and sintering the compact to prepare the dielectric material.

11. The process of claim 10, wherein the steps of introducing the hydroxyl group and mixing are conducted by mixing a barium ingredient, a rare-earth element, a titanium ingredient and an alkali metal ingredient, in the presence of water as a dispersion medium.

12. The process of claim 8, wherein the rare earth element comprises samarium.

13. The process of claim 10, wherein the rare earth element comprises samarium.

14. A dielectric filter comprising the dielectric material as claimed in claim 1.

15. A dielectric resonator comprising the dielectric material as claimed in claim 1.

* * * * *